United States Patent
Cho et al.

(10) Patent No.: US 8,212,782 B2
(45) Date of Patent: Jul. 3, 2012

(54) APPARATUS, METHOD, AND MEDIUM OF SENSING MOVEMENT OF MULTI-TOUCH POINT AND MOBILE APPARATUS USING THE SAME

(75) Inventors: Seong-il Cho, Seoul (KR); Joon-ah Park, Seoul (KR); Wook Chang, Seoul (KR); Byung-seok Soh, Suwon-si (KR); Kyoung-ho Kang, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1428 days.

(21) Appl. No.: 11/802,906

(22) Filed: May 25, 2007

(65) Prior Publication Data

US 2008/0048990 A1    Feb. 28, 2008

(30) Foreign Application Priority Data

Aug. 22, 2006 (KR) .................. 10-2006-0079477

(51) Int. Cl.
G06F 3/044 (2006.01)
(52) U.S. Cl. .................. 345/173; 345/174; 178/18.01; 178/18.06
(58) Field of Classification Search .................. 345/173
See application file for complete search history.

(56) References Cited

U.S. PATENT DOCUMENTS

| 5,880,411 A * | 3/1999 | Gillespie et al. ............ 178/18.01 |
| 6,323,846 B1 * | 11/2001 | Westerman et al. .......... 345/173 |
| 7,339,580 B2 * | 3/2008 | Westerman et al. .......... 345/173 |
| 2004/0178997 A1 * | 9/2004 | Gillespie et al. .............. 345/173 |
| 2006/0097991 A1 * | 5/2006 | Hotelling et al. ............. 345/173 |
| 2007/0081726 A1 * | 4/2007 | Westerman et al. .......... 382/185 |
| 2008/0087477 A1 * | 4/2008 | Cho et al. .................... 178/18.01 |

FOREIGN PATENT DOCUMENTS

| JP | 6-034940 | 2/1994 |
| JP | 8-147091 | 6/1996 |
| JP | 2004-199181 | 7/2004 |
| JP | 2005-049978 | 2/2005 |
| JP | 2005-100391 | 4/2005 |
| WO | 2005-114369 | 12/2005 |

OTHER PUBLICATIONS

European Search Report, issued Jun. 4, 2008, in corresponding European Patent Application No. 07114438.0.
Korean Patent Office Action dated Oct. 19, 2007 issued in corresponding Korean Patent Application No. 10-2006-0079477.
Japanese Office Action dated Feb. 28, 2012 from Japanese Patent Application No. 2007-211831.

* cited by examiner

Primary Examiner — Alexander Eisen
Assistant Examiner — Dorothy Harris
(74) Attorney, Agent, or Firm — Staas & Halsey LLP

(57) ABSTRACT

A user interface technique using a two-dimensional capacitive sensor is provided. An apparatus for sensing movement of multi-touch points includes a capacitance sensing unit sensing two or more touch points, and sensing capacitance and a change in capacitance on the basis of the sensed touch points, a movement analyzing unit sensing and analyzing a change of movement of the two or more touch points using information on the sensed capacitance and change in capacitance, and a command processing unit processing a command corresponding to the change in movement according to a result of the analysis.

28 Claims, 14 Drawing Sheets
(7 of 14 Drawing Sheet(s) Filed in Color)

| | D_X1 | D_X2 | D_X3 | D_X4 |
|---|---|---|---|---|
| Mode 1 | 1 | -1 | -1 | 1 |
| Mode 2 | -1 | 1 | 1 | -1 |
| Mode 3 | -1 | 1 | -1 | 1 |
| Mode 4 | 1 | -1 | 1 | -1 |
| Mode 5 | 0 | 0 | 0 | 0 |
| Mode 6 | THE OTHER | | | |

|  | D_X1 | D_X2 | D_X3 | D_X4 |
|---|---|---|---|---|
| Mode 1 | 1 | -1 | -1 | 1 |
| Mode 2 | -1 | 1 | 1 | -1 |
| Mode 3 | -1 | 1 | -1 | 1 |
| Mode 4 | 1 | -1 | 1 | -1 |
| Mode 5 | 0 | 0 | 0 | 0 |
| Mode 6 | THE OTHER | | | |

$D\_Xi = 1$ ; $Xi(t) - Xi(t-1) > Th1 > 0$ $D\_Xi = 0$ ; $-Th1 < Xi(t) - Xi(t-1) < Th1$ $D\_Xi = -1$ ; $Xi(t) - Xi(t-1) < -Th1 < 0$ $(i = 1, 2, 3, 4)$

POINT 1 (TOUCH POINT FIXED AT LEFT): SHOWN AS O

POINT 2 (TOUCH POINT MOVING AT RIGHT): SHOWN AS X

APPARATUS, METHOD, AND MEDIUM OF SENSING MOVEMENT OF MULTI-TOUCH POINT AND MOBILE APPARATUS USING THE SAME

CROSS-REFERENCE TO RELATED APPLICATIONS

This application claims priority benefit of Korean Patent Application No. 10-2006-0079477 filed on Aug. 22, 2006 in the Korean Intellectual Property Office, the disclosure of which is incorporated herein by reference in its entirety.

BACKGROUND OF THE INVENTION

1. Field of the Invention

The present invention relates to a user interface that uses a two-dimensional capacitive sensor, and more particularly, to an apparatus, method, and medium of sensing movement of multi-touch points that senses and analyzes a change of movement of the two or more touch points using information on capacitance that is calculated by the two or more touch points and information on a change in capacitance, and a mobile apparatus using the same.

2. Description of the Related Art

Generally, when electrodes are formed in a display screen and the electrode part is touched by a finger or the like, the capacitive-type touch sensor senses a change in capacitance that is induced between the electrode and the human finger, and transmits this sensing signal into an electrical signal to a microprocessor or a microcomputer.

For the design of a user interface using a known two-dimensional capacitive-type position sensor, a one touch point-based user interface that recognizes user's intention and analyzes commands on the basis of feedback on position information about one touch point that is generally obtained from a capacitive-type sensor has been widely used. When one finger touches the sensor that is used for the design of the one touch point-based user interface, changes in electric signal strength from respective electrodes are made depending on finger position. Here, the changes are analyzed so as to calculate the position.

However, when two or more touch points are provided because two or more fingers touch the sensor at a time (i.e., multi-touch), changes of the electrodes are made by the fingers touching the sensor. Therefore, it may be impossible to sense movement of the two or more touch points.

SUMMARY OF THE INVENTION

According to an aspect of the present invention, there is provided an apparatus and method of sensing movement of multi-touch points that can sense and analyze a change of movement of two or more touch points using information on the magnitude of capacitance of electrode channels forming a two-dimensional capacitive sensor and information on a change of the magnitude of the capacitance, and a mobile apparatus using the same.

According to another aspect of the present invention, there is provided an apparatus and method of sensing movement of multi-touch points that can sense multi-touch points based on multiple fingers even when the existing sensor for calculating a location of one touch point is used, and a mobile apparatus using the same.

According to an aspect of the present invention, there is provided an apparatus for sensing movement of multi-touch points using a two-dimensional capacitive sensor, the apparatus including a capacitance sensing unit to sense two or more touch points, and to sense capacitance and a change in capacitance on the basis of the sensed touch points, a movement analyzing unit to sense and analyze a change of movement of the two or more touch points using information on the sensed capacitance and change in capacitance, and a command processing unit to process a command corresponding to the change in movement according to a result of the analysis.

According to another aspect of the present invention, there is provided a method of sensing movement of multi-touch points using a two-dimensional capacitive sensor, the method including sensing two or more touch points, and sensing capacitance and a change in capacitance on the basis of the sensed touch points, sensing and analyzing a change of movement of the two or more touch points using information the sensed capacitance and change in capacitance, and processing a command corresponding to the change of movement according to a result of the analysis.

According to still another aspect of the present invention, there is provided a mobile apparatus that senses movement of multi-touch points using a two-dimensional capacitive sensor, the apparatus including a capacitive sensor to sense two or more touch points, and to sense capacitance and a change in capacitance on the basis of the sensed touch points, a movement analyzing unit to sense and analyze a change of movement of the two or more touch points using information on the sensed capacitance and change in capacitance, an output unit to output a command corresponding to the change of movement according to a result of the analysis, and a command processing control unit controlling to process the output command.

According to another aspect of the present invention, there is provided an apparatus for sensing movement of multi-touch points using a two-dimensional capacitive sensor, the apparatus including a capacitance sensor to sense two or more touch points, and to sense capacitance and a change in capacitance on the basis of the sensed touch points; and a movement analyzer to sense and analyze a change of movement of the two or more touch points using information on the sensed capacitance and change in capacitance to determine a movement pattern.

According to another aspect of the present invention, there is provided a method of sensing movement of multi-touch points using a two-dimensional capacitive sensor, the method including sensing capacitance and a change in capacitance based on two or more sensed touch points; and sensing and analyzing a change of movement of the two or more touch points using information on the sensed capacitance and change in capacitance to determine a movement pattern.

According to another aspect of the present invention, there is provided a mobile apparatus that has a touch screen and senses movement of multi-touch points, the apparatus including a capacitive sensor to sense two or more touch points, and to sense capacitance and a change in capacitance on the basis of the sensed touch points; and a movement analyzer to sense and analyze a change of movement of the two or more touch points using information on the sensed capacitance and change in capacitance to determine a movement pattern.

According to another aspect of the present invention, there is provided at least one computer readable medium storing computer readable instructions to implement methods of the present invention.

BRIEF DESCRIPTION OF THE DRAWINGS

The patent or application file contains at least one drawing executed in color. Copies of this patent or patent application publication with color drawing(s) will be provided by the Office upon request and payment of the necessary fee. These and/or other aspects, features and advantages of the invention will become apparent and more readily appreciated from the following description of exemplary embodiments, taken in conjunction with the accompanying drawings of which:

FIG. 5 is an exemplary view showing modes of patterns of movement of multi-touch points according to an exemplary embodiment of the invention;

DETAILED DESCRIPTION OF THE PREFERRED EMBODIMENTS

Figure 1:
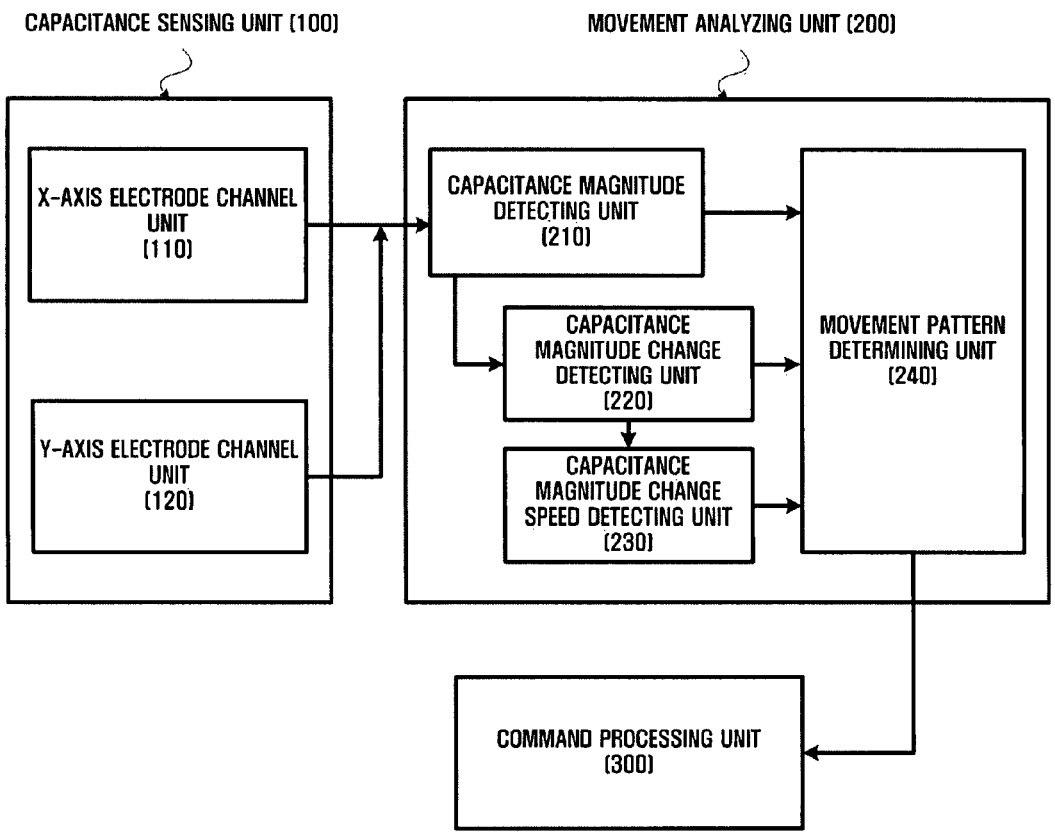
FIG. 1 is a view showing the entire structure of an apparatus for sensing movement of multi-touch points according to an exemplary embodiment of the invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Advantages, aspects, and features of the invention and methods of accomplishing the same may be understood more readily by reference to the following exemplary embodiments and the examples shown in accompanying drawings. The invention may, however, be embodied in many different forms and should not be construed as being limited to exemplary embodiments set forth herein. Rather, these exemplary embodiments are provided so that this disclosure will be thorough and complete and will fully convey the concept of the invention to those skilled in the art, and the invention will only be defined by the appended claims and equivalents.

FIG. 1 is a view showing the entire structure of an apparatus for sensing movement of multi-touch points according to an exemplary embodiment of the invention. Referring to FIG. 1, the apparatus for sensing movement of multi-touch points includes a capacitance sensing unit 100, a movement analyzing unit 200, and a command processing unit 300.

The capacitance sensing unit 100 senses two or more touch points using a two-dimensional capacitive sensor, and senses capacitance and a change in capacitance from the sensed touch points. To do so, in general, preferably, the capacitance sensing unit 100 includes an X-axis electrode channel unit 110 that has an 'M' number of X-axis sensing electrode channels arranged in a vertical direction at predetermined intervals and a Y-axis electrode channel unit 120 that has an 'N' number of Y-axis sensing electrode channels arranged in a horizontal direction at predetermined intervals.

Figure 2:
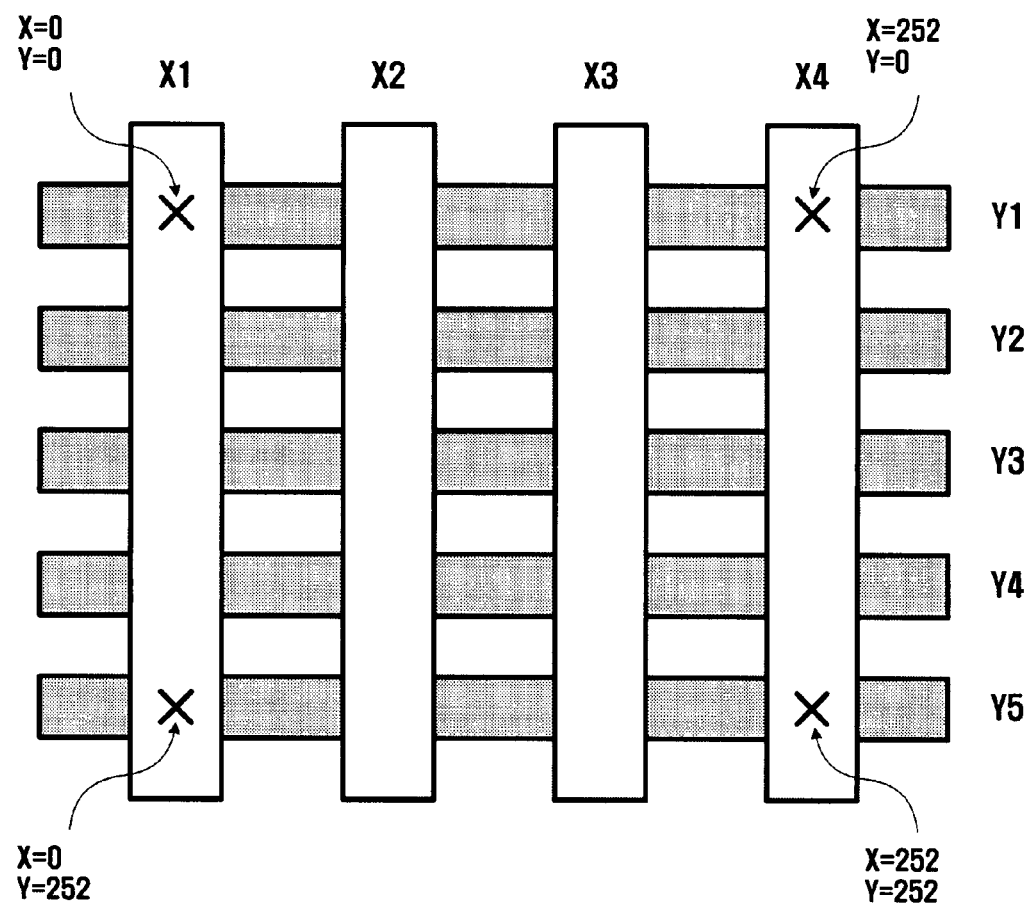
FIG. 2 is an exemplary view illustrating a structure of an electrode arrangement of a capacitive sensor according to an exemplary embodiment of the invention.

Here, FIG. 2 illustrates a structure of an electrode arrangement of a capacitive sensor that forms the X-axis electrode channel unit 110 and the Y-axis electrode channel unit 120 according to one exemplary embodiment of the invention. For convenience of explanation, there are four X-axis electrode channels arranged in the vertical direction, that is, X1, X2, X3, and X4 electrodes, and five Y-axis electrode channels arranged in the horizontal direction, that is, Y1, Y2, Y3, Y4, and Y5 electrodes. However, the structure is only one example of exemplary embodiments of the invention for the convenience of explanation, but the invention is not limited to the electrode structure of FIG. 2. In FIG. 2, a position where the X1 electrode and the Y1 electrode meet is (0, 0), which is the origin. A position where the X4 electrode and the Y1 electrode meet will be (252, 0), a position where the X1 electrode and the Y5 electrode meet will be (0, 252), and a position where the X4 electrode and the Y5 electrode meet will be (252, 252).

In the electrode arrangement of FIG. 2, a change in the magnitude of the capacitance occurs in the electrode channels provided in the X-axis electrode channel unit 110 and the Y-axis electrode channel unit 120 according to a position of a touch point touched by a human finger. Further, this change is sensed so as to calculate position information. In this case, a method that is most widely used to calculate the position information includes a weighted average method, which is as the following <Equation>.

$$P_x = \frac{\sum_{i=1}^{M} x_i p_x^i}{\sum_{i=1}^{M} x_i}$$

$$P_y = \frac{\sum_{j=1}^{N} y_j p_y^j}{\sum_{j=1}^{N} y_j}$$

<Equation>

Figure 3A:
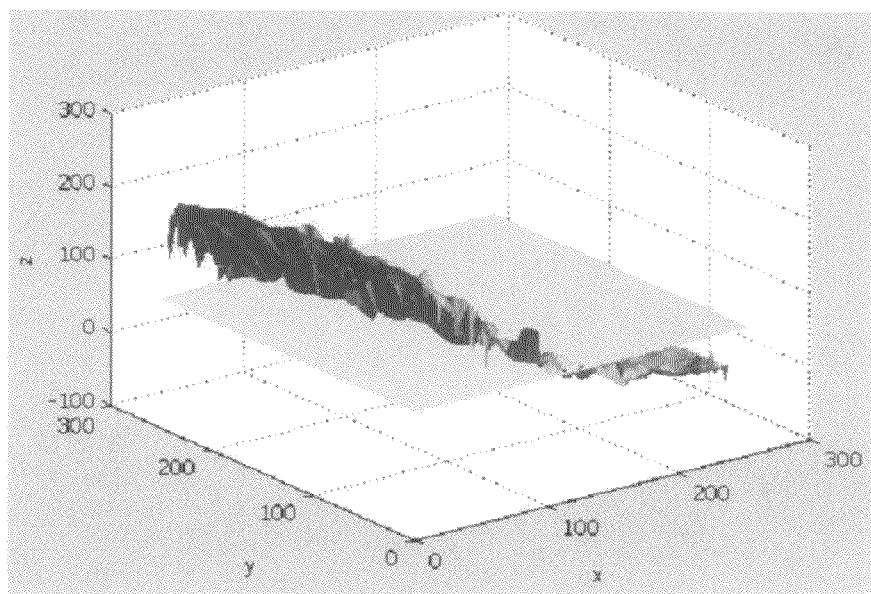
FIGS. 3A through 3I are views illustrating change in the magnitude of capacitance according to the position of electrodes of the capacitive sensor according to an exemplary embodiment.
Figure 3B:
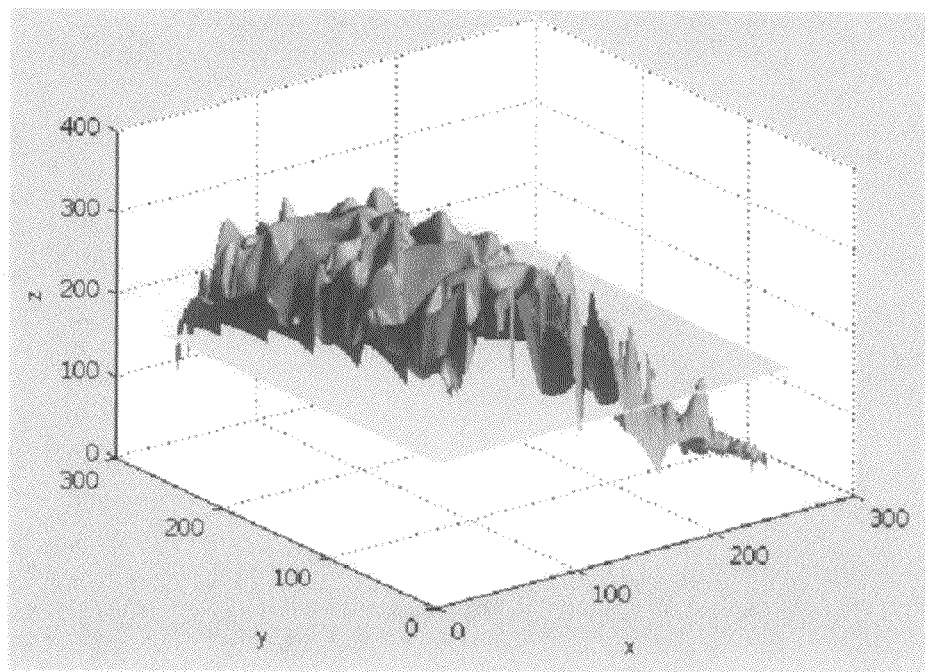
Figure 3C:
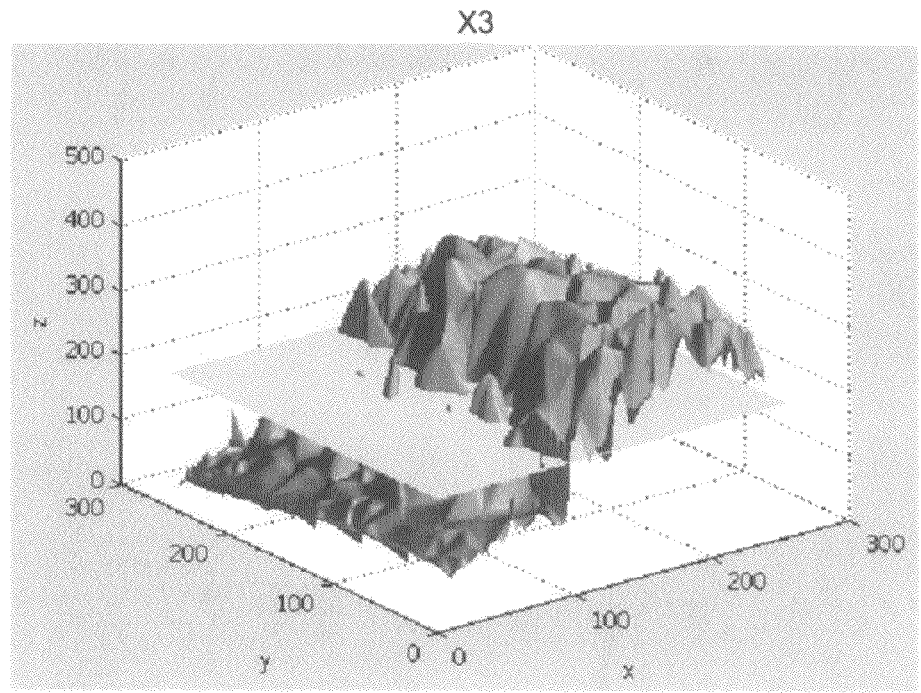
Figure 3D:
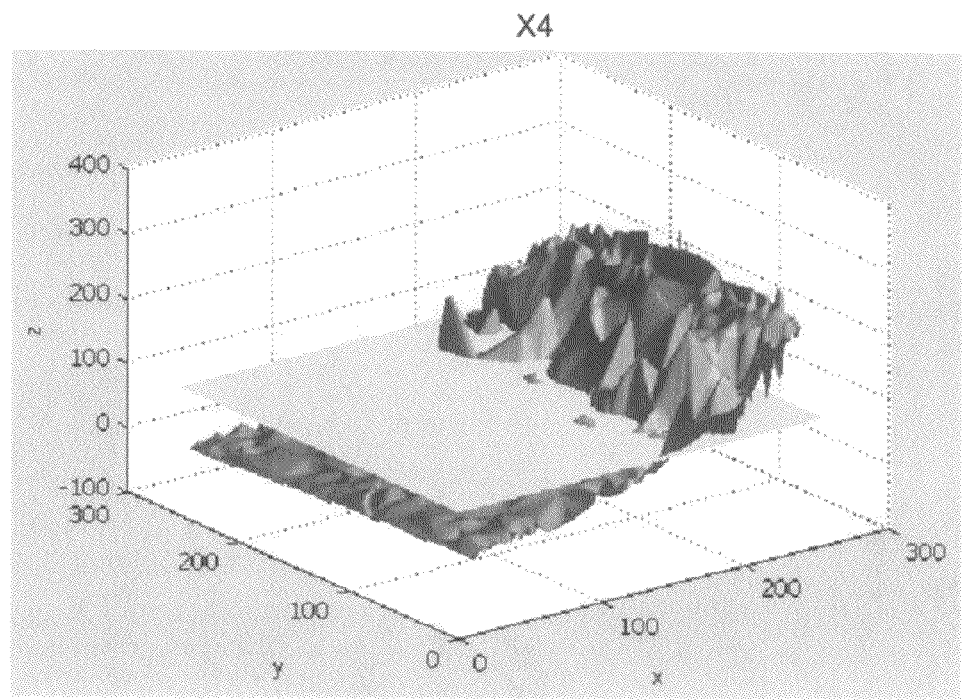
Figure 3E:
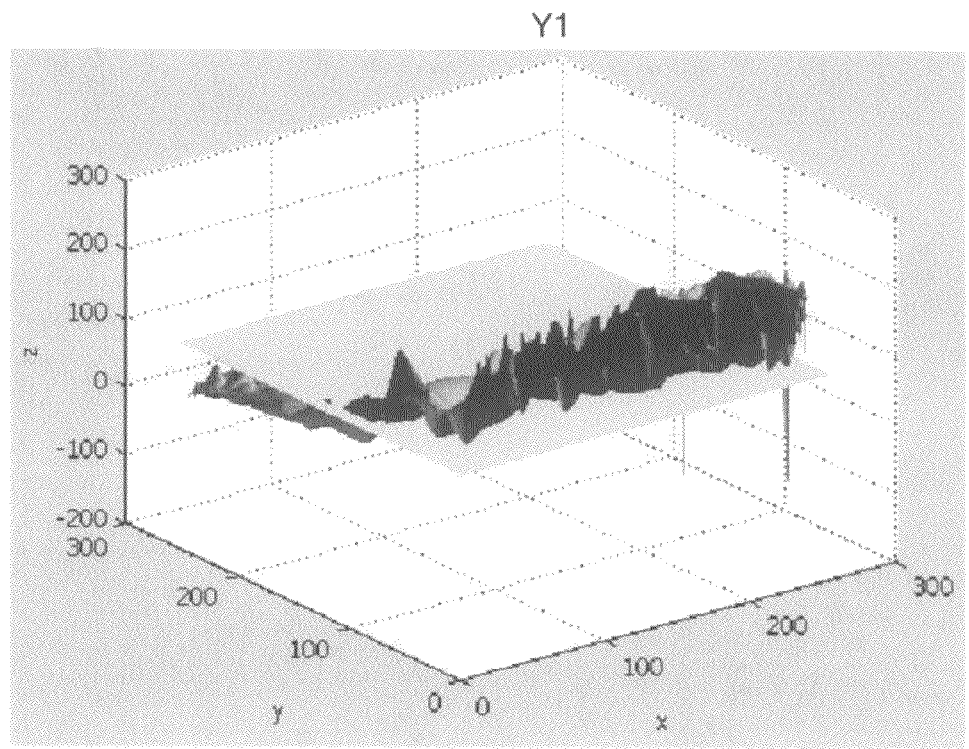
Figure 3F:
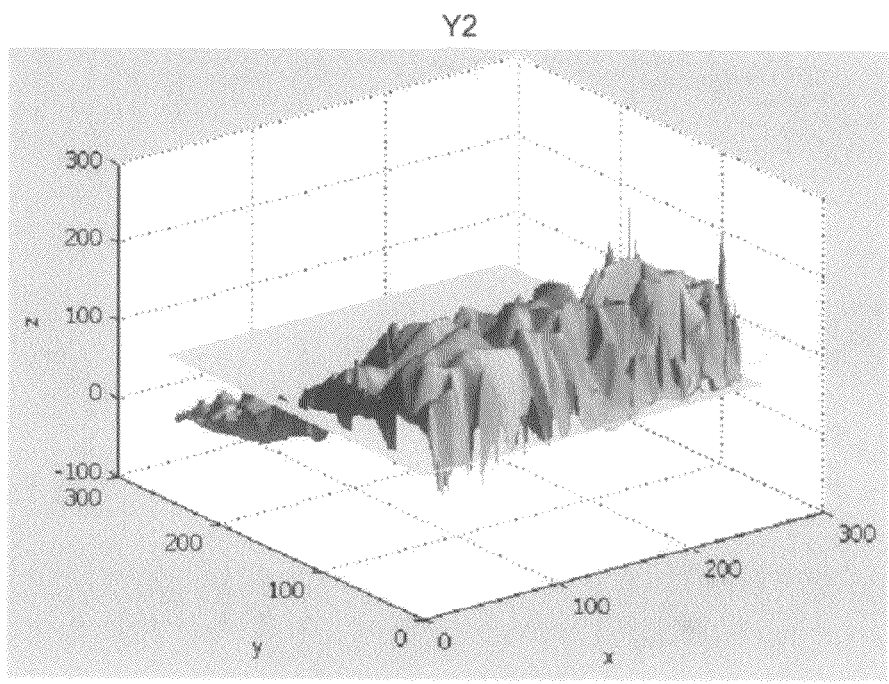
Figure 3G:
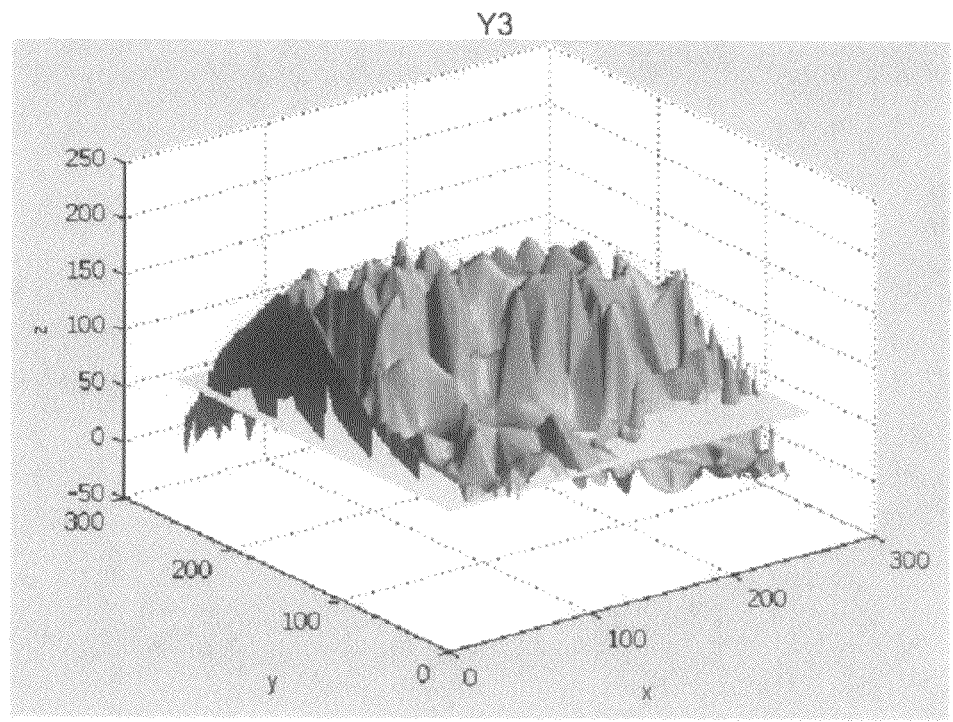
Figure 3H:
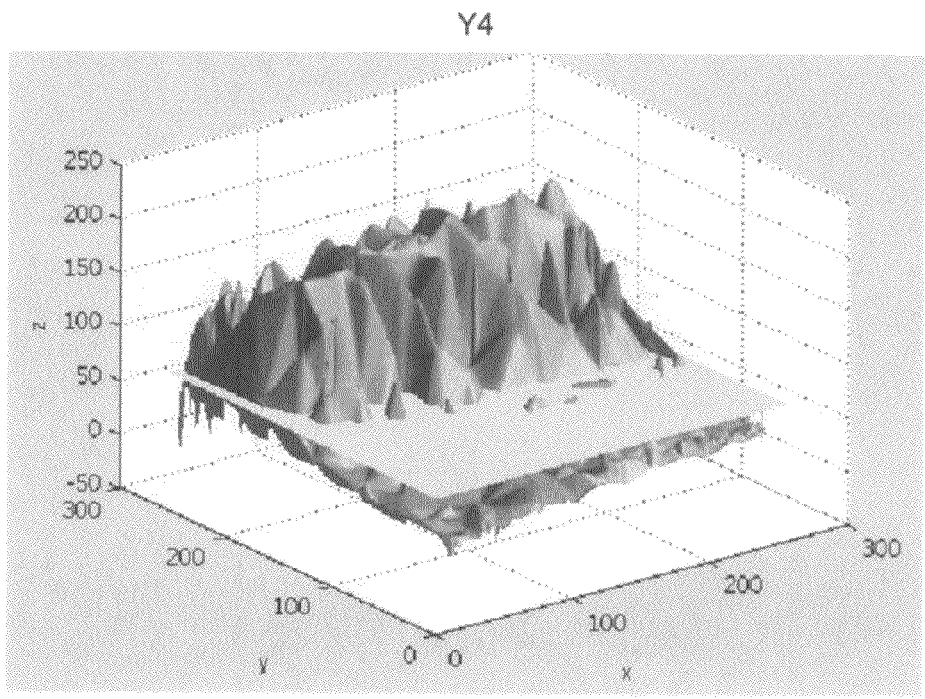
Figure 3I:
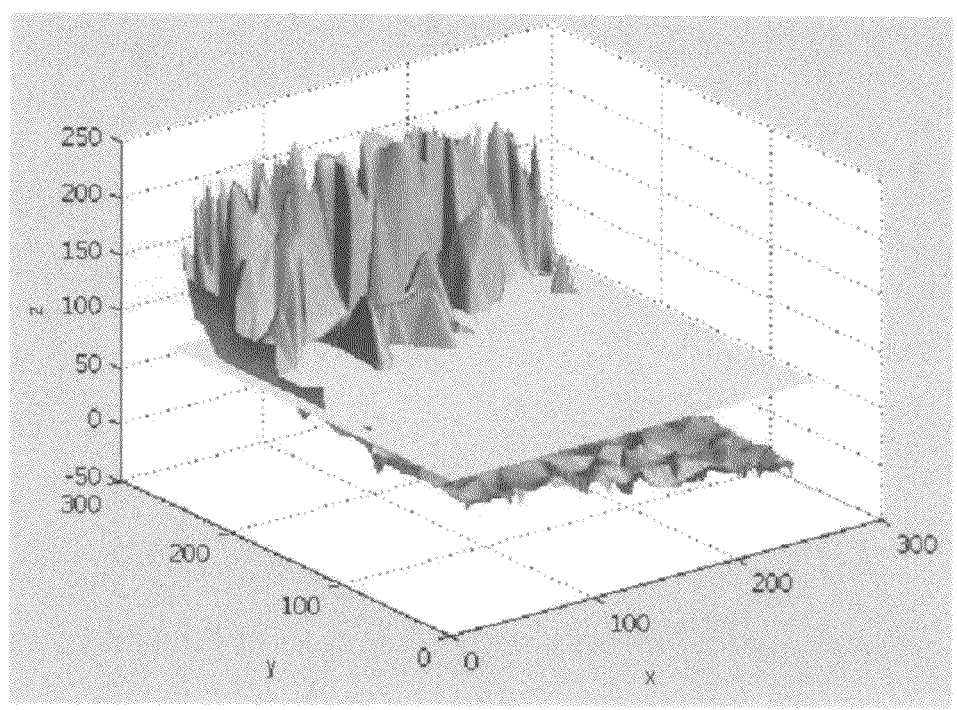

The $P_x$ and $P_y$ are an x-axis position value and a y-axis position value, respectively, which are calculated according to the weighted average method. The $p_x^i$ is a position value that is arbitrarily defined in an i-th electrode channel along the X axis, and $p_y^j$ is a position value that is arbitrarily defined in a j-th electrode channel along the Y axis. Further, the $x_i$ is the magnitude of capacitance generated in the $p_x^i$, and the $y_j$ is the magnitude of capacitance generated in the $p_y^j$. When the position information is calculated according to the weighted average method, a change in the magnitude of the capacitance of the electrodes occurs according to the position of a touch point. Change in the magnitude of the capacitance of the electrodes that are made according to a movement of the electrodes in the electrode arrangement of FIG. 2 are shown in FIGS. 3A through 3I. In FIG. 3A, when the finger moves in a vertical direction along the X1 axis, the magnitude increases at positions where the x-coordinate is low, and in a case of the X2 axis (FIG. 3B), the magnitude increases at positions where the x-coordinate is slightly higher than the x-coordinate along the X1 axis. According to this principle, the x-coordinates at positions where the magnitude increases are higher toward the X3 axis (FIG. 3C) and the X4 axis (FIG. 3D). The same principle is applied to the Y1 axis to Y5 axis (FIGS. 3E to 3I).

According to the above-described method, the movement analyzing unit 200 calculates position information on one point, or senses and analyzes a change of movement of the two or more touch points using the information on the magnitude of the capacitance and the change in the magnitude of the capacitance. Here, the movement analyzing unit 200 uses information on a differential value that the detected capacitance magnitude changes over time as well as the information on the capacitance magnitude that is detected in the electrode channel by the capacitance magnitude detecting unit 210. The differential value is detected by the capacitance magnitude change detecting unit 220. In addition, information on a change of the differential value over time, that is, information on change speed of the capacitance magnitude over time (i.e., a second-order differential value of the capacitance magnitude) may also be included, and this information is detected by a capacitance magnitude change speed detecting unit 230.

Therefore, using the information on the capacitance magnitude and the change of the capacitance magnitude over time, and the information on the change speed of the capacitance magnitude over time, a movement pattern determining unit 240 determines a movement pattern of the two or more touch points. According to an exemplary embodiment of the invention, there are three main movement patterns. That is, there are a multi-touch point moving mode that when two fingers touch at the same time within a predetermined time or one touches after the other with a predetermined time, each of the two fingers moves vertically or horizontally, a one point-fixed one point-moving mode that when one finger touches and is fixed, the other finger tracks while moving vertically or horizontally moves, and a non-moving mode that two touch points move to a degree that does not exceed a predetermined threshold value or the two touch points do not move at all. A classification basis for the three modes will be described in detail.

The movement pattern determining unit 240 determines the multi-touch point moving mode when a change of the capacitance magnitude over time is larger than a predetermined threshold value in a case of two or more parallel electrode channels among the "M" number of X-axis electrode channels or the "N" number of Y-axis electrode channels. When the change of the capacitance magnitude over time is smaller than the predetermined threshold value, the movement pattern determining unit 240 determines the non-moving mode. Further, when the two or more touch points are generated with the predetermined time, if the magnitude of the capacitance at the first touch point in contact with one electrode channel keeps constant, and at the same time, the change of the capacitance magnitude over time at the second touch point in contact with another electrode channel in parallel with the electrode channel is larger than the predetermined threshold value, the movement pattern determining unit 240 determines the one point-fixed one point-moving mode.

On the assumption that two touch points generated by two fingers move in a horizontal direction, four modes may be created as the multi-touch point moving mode. That is, there are a mode LR Out that all of the two touch points move outward, a mode LR In that the two touch points move inward, a mode L In R Out that the left touch point moves inward and the right touch point moves outward, and a mode L Out R In that the left touch point moves outward and the right touch point moves inward.

Figure 9A:
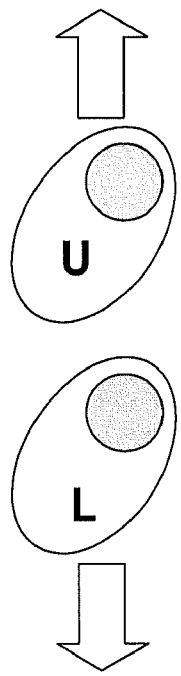
FIGS. 9A-9D are exemplary embodiments of multi-touch point moving modes.
Figure 9B:
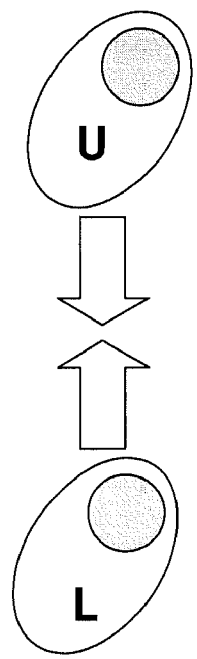
Figure 9C:
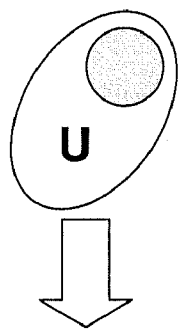
Figure 9C:
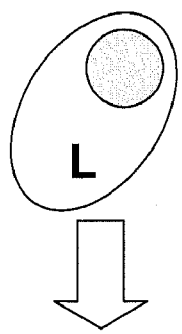
Figure 9D:
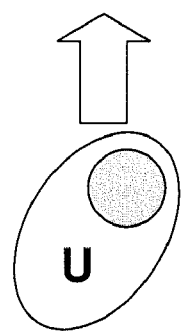
Figure 9D:
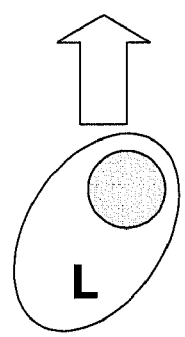

On the assumption that the two touch points generated by the two fingers move in a vertical direction, in the same way, four modes may be created as the multi-touch point moving mode. That is, with reference to FIG. 9A, there is a mode Upper Lower Out that the two touch points move upward and downward. With reference to FIG. 9B, there is a mode Upper Lower In that the two touch points move inward. With reference to FIG. 9C, there is a mode Upper In Lower Out that the upper touch point moves inward and the lower touch point moves downward. And with reference to FIG. 9D, there is a mode Upper Out Lower In that the upper touch point moves outward and the lower touch point moves inward.

When the two fingers freely move in the multi-touch point moving mode on a two-dimensional screen, the movement is separated into a horizontal component and a vertical component, such that the movement pattern may be determined according to the method.

The command processing unit 300 processes a command corresponding to a change of movement of user's fingers according to the movement pattern that is analyzed according to the above-described method.

The term "unit" used in FIG. 1 denotes software, or a hardware component such as an FPGA (Field Programmable Gate Array) or an ASIC (Application Specific Integrated Circuit) and the modules each perform allocated functions. However, the modules are not limited to software or hardware. The modules may be configured in an addressable storage medium, or may be configured to run on at least one processor. Therefore, as an example, the modules include: components such as software components, object-oriented software components, class components, and task components; processors, functions, attributes, procedures, sub-routines, segments of program codes, drivers, firmware, microcodes, circuits, data, databases, data structures, tables, arrays, and variables. The functions provided by the components and the modules may be combined into fewer components and or modules may be separated into additional components and modules. In addition, the components and the modules may be configured to execute at least one CPU in a device.

A flow of sequential steps of performing the method according to an exemplary embodiment of the invention will be described with reference to FIGS. 4 to 8.

Figure 4:
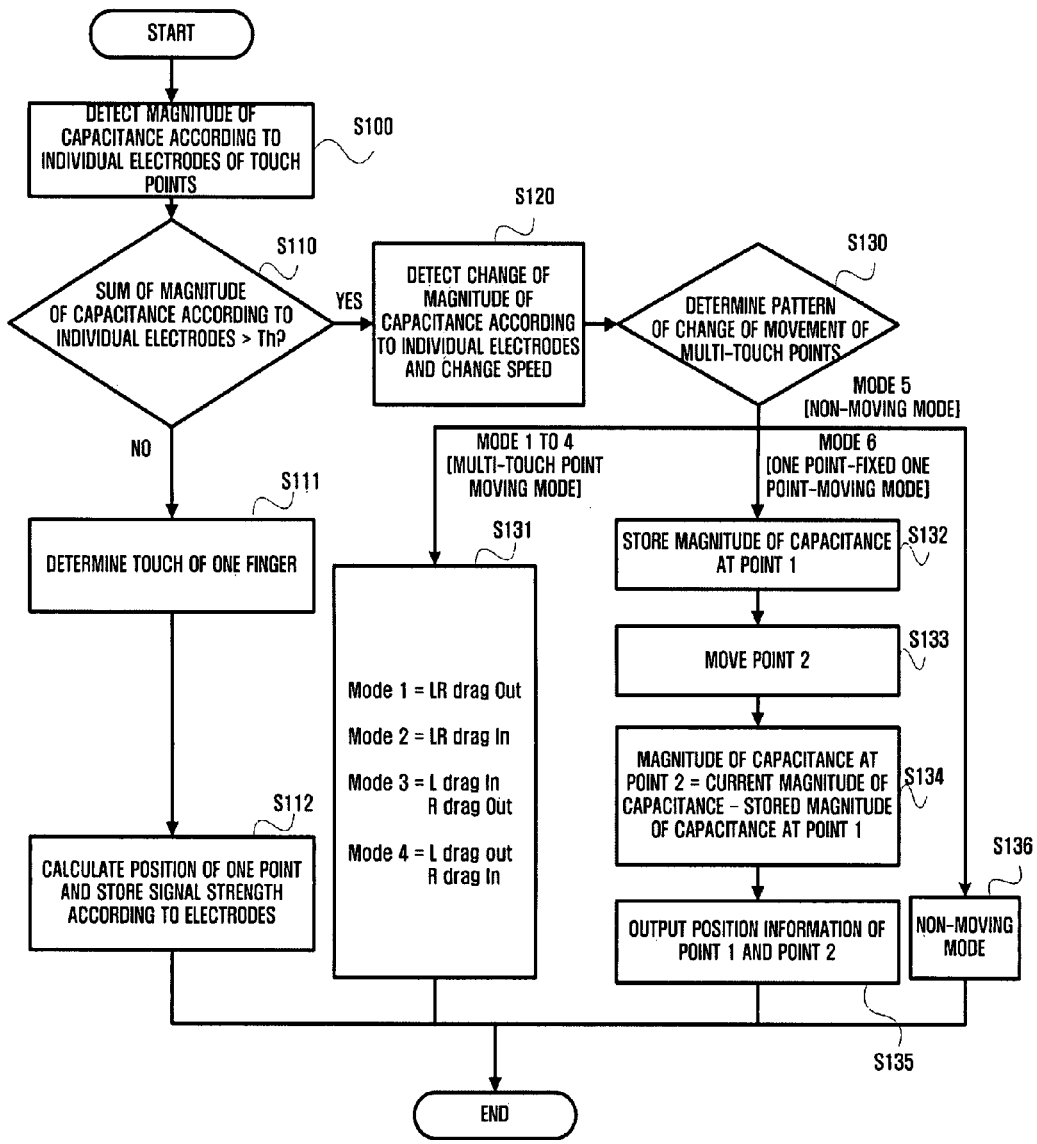
FIG. 4 is a flow chart showing a method of sensing movement of multi-touch points according to an exemplary embodiment of the invention.
Figure 6A:
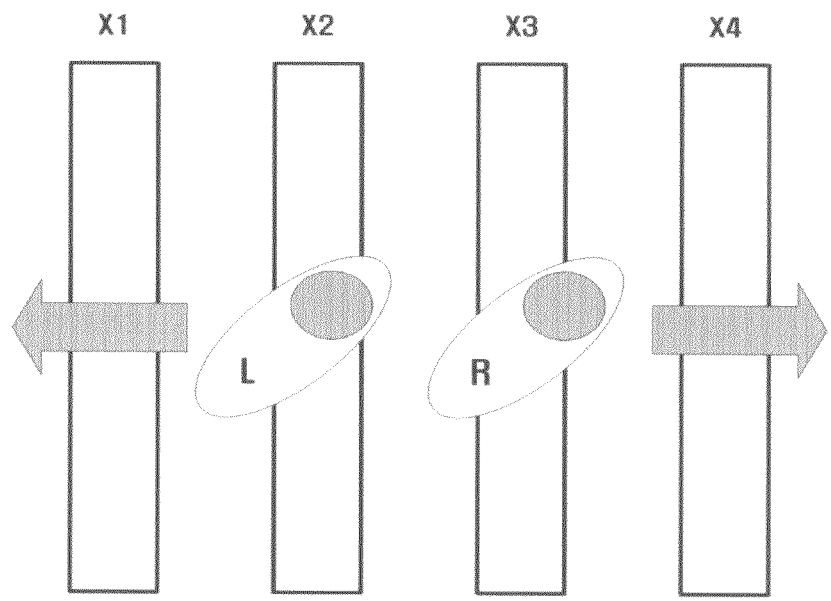
FIG. 6A is a view showing a first embodiment of a multi-touch point moving mode.
Figure 6B:
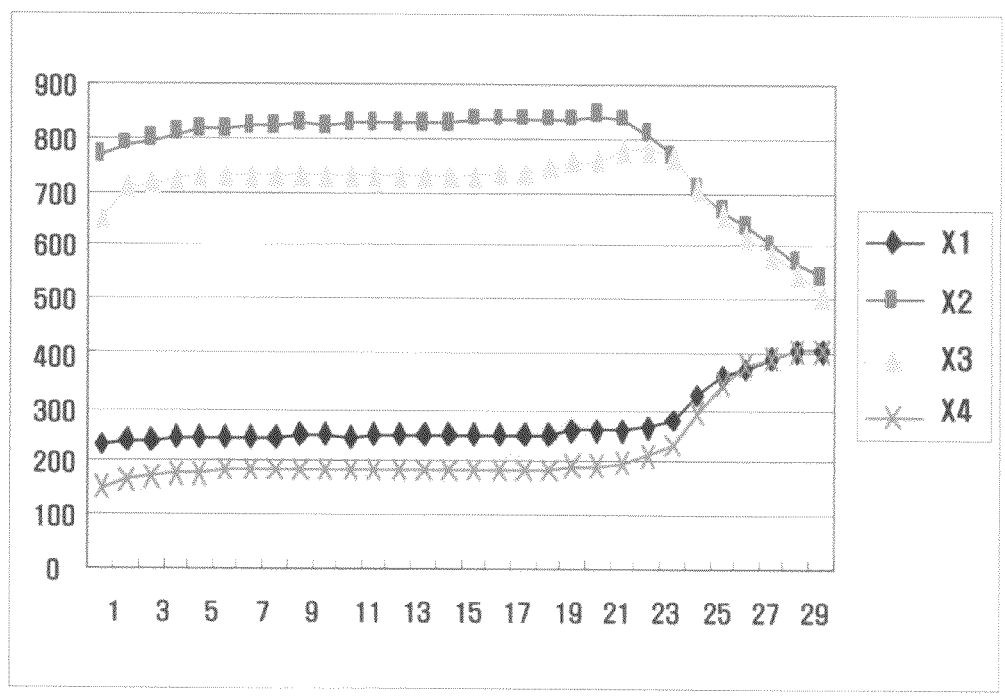
FIG. 6B is a view showing a graph illustrating a change of the magnitude of capacitance according to electrodes of the first exemplary embodiment.

FIG. 4 is a flow chart showing a method of sensing movement of multi-touch points according to an exemplary embodiment of the invention. First, the capacitance magnitude detecting unit 210 detects the magnitude of capacitance according to electrodes of touch points on a touch screen that is sensed by the capacitance sensing unit 100 (STEP S100). It is determined whether the sum of the detected capacitance magnitude according to the electrodes is larger than a threshold value Th or not (STEP S110). When the sum is not larger than the threshold value Th, it is determined that a touch of one finger is made (i.e., one point touch) (STEP S111). That is, since a sensing operation is performed according to the one touch point movement like the related art, the position of the one point is calculated and signal strength according to individual electrodes is stored (STEP S112).

When the sum of the detected capacitance magnitude according to the individual electrodes is larger than the predetermined threshold value Th, it is determined as movement of the multi-touch points. In this case, information on a change of the capacitance magnitude according to the individual electrodes over time is detected by the capacitance magnitude change detecting unit 220, and the capacitance magnitude change speed detecting unit 230 detects information on capacitance magnitude change speed that is obtained by differentiating the change in the capacitance magnitude with respect to time (STEP S120). Using the detected information, the movement pattern determining unit 240 determines a pattern on movement of the multi-touch points (STEP S130).

Here, the threshold value Th is larger than the capacitance magnitude that is generated by a touch point by user's one finger but smaller than the sum of the capacitance magnitude that is generated by touch points touched by all the fingers. The threshold value Th may be generally determined through user experiments.

There are a multi-touch point moving mode, a one point-fixed one point-moving mode, and a non-moving mode, which are classified by the movement pattern determining unit 240, referring to FIG. 5. FIG. 5 is an exemplary view showing modes of movement patterns of multi-touch points according to an exemplary embodiment of the invention.

On the assumption that there are four X-axis electrode channels arranged in a vertical direction in order of X1, X2, X3, and X4, D-Xi (wherein, i=1, 2, 3, or 4) shows a value of a change in capacitance magnitude in an i-th electrode channel, and may have a value of 1, 0, or −1. In a case of D_Xi=1, a value obtained by subtracting capacitance magnitude Xi (t−1) of an electrode channel at previous time t−1 from current capacitance magnitude Xi (t) of the electrode channel at current time t is larger than a positive predetermined threshold value Th1. That is, the change of the capacitance magnitude over time in the i-th electrode channel increases meaningfully. In a case of D_Xi=−1, the value obtained by subtracting the Xi (t−1) from the Xi (t) is smaller than a negative predetermined threshold value−Th1. That is, the change of the capacitance magnitude over time in the i-th electrode channel decreases meaningfully. Further, in a case of D_Xi=0, the value obtained by subtracting the Xi (t−1) from the Xi (t) is smaller than the positive predetermined value Th1 and larger than the negative predetermined threshold value−Th1. That is, the change of the capacitance magnitude over time in the i-th electrode channel has no relation with user's operation.

Referring to FIG. 4, the movement pattern determining unit 240 determines the multi-touch point moving mode that all of the two or more touch points move when the change of the capacitance magnitude over time is larger than the positive predetermined threshold value+Th1 or smaller than the negative predetermined threshold value−Th1 in a case of two or more parallel electrode channels among the "M" number of X-axis electrode channels or the "N" number of Y-axis channels (STEP S131). On the assumption that two touch points using two fingers move in the horizontal direction, four modes may be created as the multi-touch point mode. That is, there are a first mode LeftRight Out that all of the two touch points move outward, a second mode LeftRight In that all of the two touch points move inward, a third mode Left In Right Out that the left touch point moves inward and the right touch point moves outward, and a fourth mode Left Out Right In that the left touch point moves outward and the right touch point moves inward.

Referring to FIG. 5 again, since the two touch points move outward in the first mode, when there are four electrode channels, it can be seen that the fingers move toward electrodes X1 and X4. Therefore, the magnitude of the capacitance of the X1 and X4 electrodes increases as the fingers move, and the magnitude of the capacitance of the X2 and X3 gradually decreases. That is, values of the D_X1 and the D_X4 will be 1, and values of the remaining D_X2 and D_X3 will be −1, which can be understood with reference to FIGS. 6A and 6B. When each of the two fingers moves outward like FIG. 6A, in a graph of FIG. 6B, it can be seen that the magnitude of the capacitance of X1 and X4 increases, while the magnitude of the capacitance of X2 and X3 decreases. Using the change (i.e., a differential value) of the capacitance magnitude of the electrodes, the movement pattern determining unit 240 recognizes the first mode LeftRight Out.

Figure 7A:
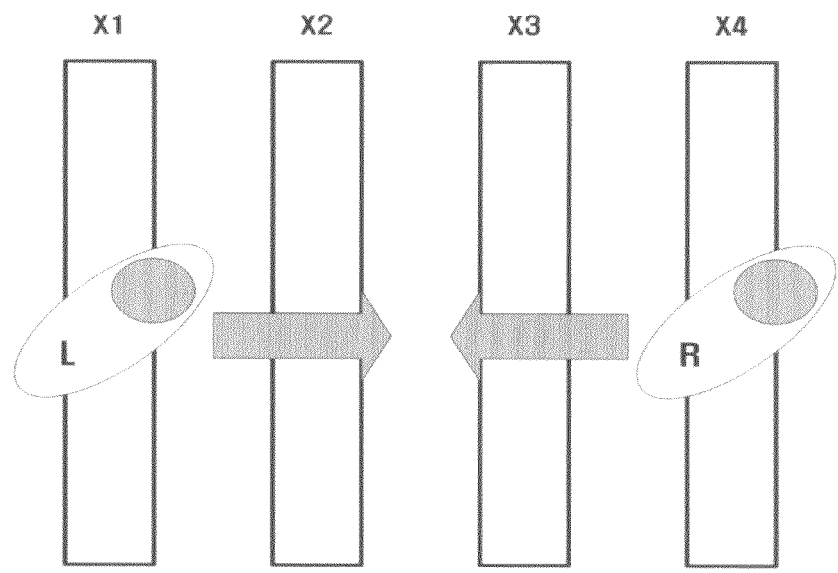
FIG. 7A is a view showing a second exemplary embodiment of a multi-touch point moving mode.
Figure 7B:
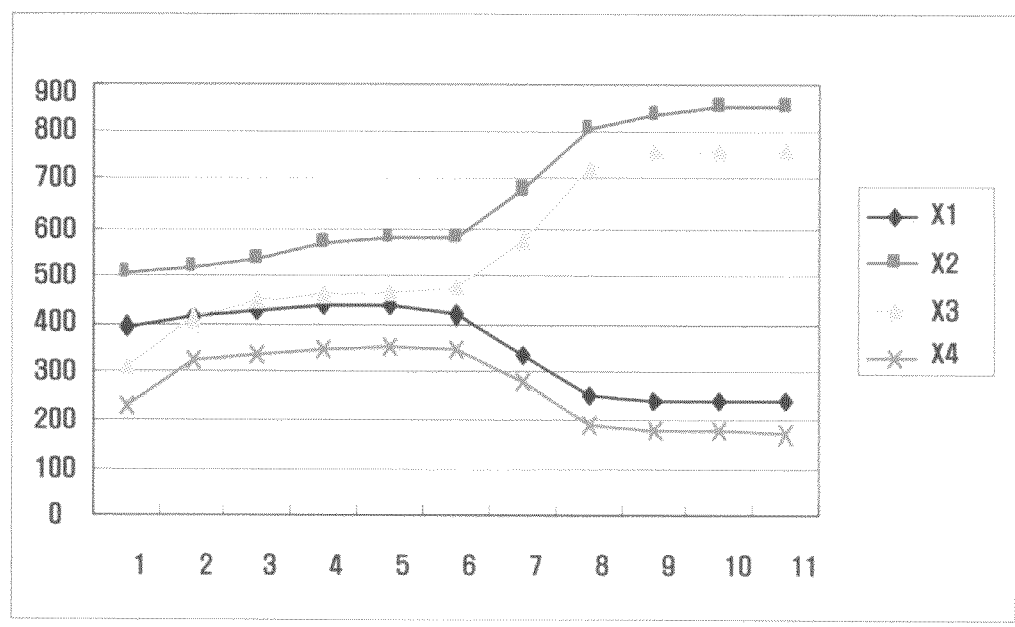
FIG. 7B is a view showing a graph illustrating a change of the magnitude of capacitance according to electrodes of the second exemplary embodiment.

In a case of the second mode, since all of the two touch points move inward, the magnitude of the capacitance of the X1 and X4 electrodes decreases as the fingers move, while the magnitude of the capacitance X2 and X3 gradually increases. That is, the values of D_X1 and D_X4 will be −1, and the remaining values of D_X2 and D_X3 will be 1, which will can understood with reference to FIGS. 7A and 7B. As shown in FIG. 7A, when the two fingers move inward, in a graph of FIG. 7B, it can be seen that the magnitude of the capacitance of X1 and X4 decreases, while the magnitude of the capacitance of X2 and X3 increases.

In a case of the third mode, since the left touch point moves inward and the right touch point moves outward, the values of D_X2 and D_X4 will be 1, and the values of the remaining D_X1 and D_X3 will be −1. In a case of the fourth mode, since the left touch point moves outward, and the right mode moves inward, the values of D_X1 and D_X3 will be 1, and the values of the remaining D_X2 and D_X4 will be −1.

In the case of the multi-touch point moving mode, the determination is not made only using the change value (the differential value) of the capacitance magnitude, but information on change speed of the capacitance magnitude (i.e., a second-order differential value of the capacitance magnitude) is used additionally. Accordingly, it is possible to increase accuracy of determination on a change of movement of the multi-touch points and accurately find out a point of time for the determination. This is because it is possible to more accurately find out a degree to which the change value of the capacitance magnitude changes on the basis of the change speed of the capacitance magnitude. When the change speed of the capacitance magnitude has a value of more than 0, this indicates that the capacitance magnitude increases more and more. When a value of the change speed of the capacitance magnitude changes from a positive number to a negative number, the increase of the change value of the capacitance magnitude is slowed and the movement of the touch points is finished. Therefore, when the user issues a command at the point of time (i.e., a point of inflection) when a sign of the change speed of the capacitance magnitude changes in the four multi-touch point moving modes, the operation may be performed more smoothly.

In the case of the multi-touch point moving modes, unlike the known operation of sensing a position of one touch point, it may be impossible to recognize position information on each of the touch points, but it is possible to recognize information on a change of movement due to the change of the capacitance with respect to moving directions or paths of the multi-touch points.

When it is determined as a non-moving mode (a fifth mode) in FIG. 4 (STEP S136), as shown in a table of FIG. 5, the change value D_Xi (wherein i=1, 2, 3, or 4) of the capacitance magnitude in every electrode channel becomes 0. That is, since the change of the capacitance magnitude over time in the predetermined electrode channel has no relation with user operation, it is not recognized as a command.

Figure 8:
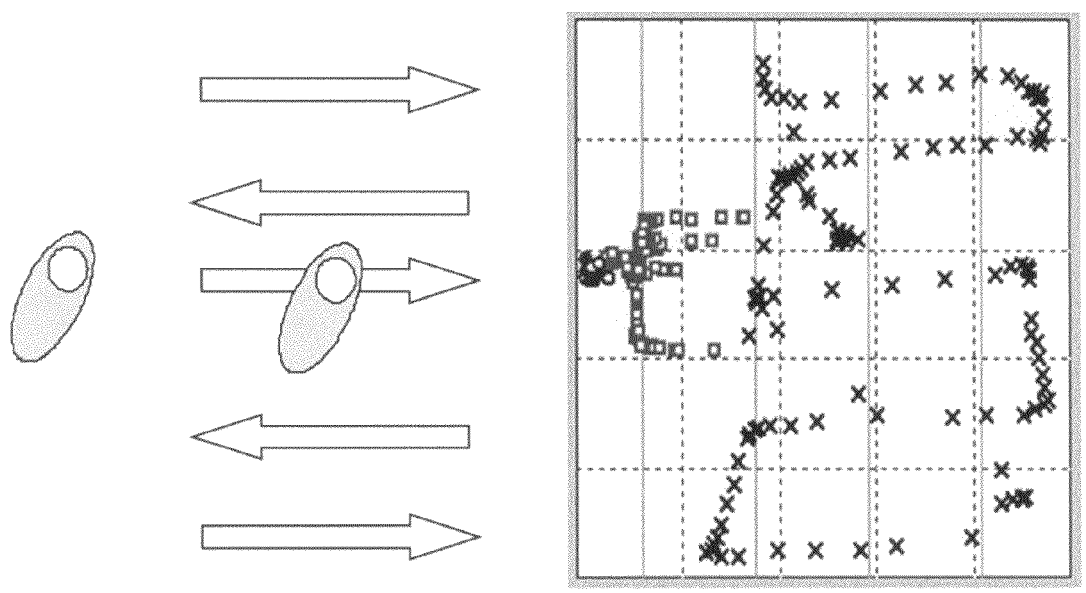
FIG. 8 is a view showing a one point-fixed one point-moving mode according to an embodiment and a moving path of touch points in an exemplary embodiment.

When the two or more touch points are created with a predetermined time, that is, when the magnitude of the capacitance keeps constant in the first touch point of the predetermined electrode channel that is created as user's one finger touches, another finger touches the second touch point of another electrode channel in parallel with the electrode channel and moves vertically and horizontally. At this time, when the change of the capacitance magnitude over time is larger than the predetermined value Th1, it is determined as a one point-fixed one point-moving mode, which is a sixth mode. In general, in this mode, the two touch points are created with more than a predetermined time. FIG. 8 is an exemplary view showing a moving path of the touch points in the one point-fixed one point-moving mode. The touch point (Point 1) that is fixed at the left is shown as 0, and the touch point (Point 2) that horizontally moves at the right is shown as X.

In the multi-touch point moving mode, the information on the change of movement of the multi-touch points can be obtained, while in the one point-fixed one point-moving mode, position information on the individual multi-touch points can be obtained. A process of calculating position information on individual multi-touch points will now be described.

First, when capacitance magnitude of the first touch point is stored (STEP S132), the second touch point created with a predetermined time moves while scrolling (STEP S133). The capacitance magnitude of the first touch point that is stored in step S132 is subtracted from capacitance magnitude obtained after the second touch point moves so as to calculate capacitance magnitude of the second touch point (STEP S134). Position information on the first touch point and the second touch point can be calculated based on the capacitance magnitude of the first touch point and the capacitance magnitude of the second touch point using the above-described <Equation> according to the weighted average method (STEP S135).

When the mode does not change from the one point-fixed one point-moving mode to the multi-touch point moving mode because two fingers do not move at the same time, the one point-touched one-point moving mode can be maintained by changing roles of the two fingers. That is, the scroll operation is performed using the right finger while the left finger is fixed, and then, the scroll operation is performed using the left finger while the right finger is fixed. In this case, a value of capacitance magnitude by the right finger at the last moment of the change is stored, and a difference value between a current value of capacitance magnitude that is newly input after the change and the previously stored value of capacitance magnitude corresponds to the capacitance magnitude of the left finger. As a result, the position of the left finger can be detected.

The above-described exemplary embodiment of the invention can be applied to a mobile apparatus having a touch screen that uses two-dimensional capacitive sensor. Examples of mobile apparatuses include but are not limited to In this case, an output unit outputting commands in response to a change of movement of two or more touch points that is analyzed by the movement analyzing unit 200 and a command processing control unit controlling to process the output commands are additionally needed.

Examples of mobile apparatuses include to which an apparatus of an exemplary embodiment may be applied include but are not limited to a personal digital assistant (PDA), portable media player (PMP), digital camera, and portable game player. PMPs are portable devices capable of playing back various multimedia files (e.g., video, music, and photo files) ranging from MP3 music files to still image/moving image content items. (An example of a PMP is an MP3 player.) PMPs have a variety of additional functions and are designed as embedded systems comprised of a CPU, a memory, an auxiliary memory device, and other peripheral devices so as to perform multiple tasks. Further, it is understood that the present invention is also applicable to any device with which an apparatus, method, or medium of an exemplary embodiment can be used.

In addition, it will be understood by those skilled in the art that a computer readable recording medium having a program code for allowing a computer to execute the method according to exemplary embodiments of the invention stored therein can be included in the scope of the apparatus for sensing movement of multi-touch points according to an exemplary embodiment of the invention.

In addition to the above-described exemplary embodiments, exemplary embodiments of the present invention can also be implemented by executing computer readable code/instructions in/on a medium/media, e.g., a computer readable medium/media. The medium/media can correspond to any medium/media permitting the storing of the computer readable code/instructions. The medium/media may also include, alone or in combination with the computer readable code/instructions, data files, data structures, and the like. Examples of code/instructions include both machine code, such as produced by a compiler, and files containing higher level code that may be executed by a computing device and the like using an interpreter. In addition, code/instructions may include functional programs and code segments.

The computer readable code/instructions can be recorded in/on a medium/media in a variety of ways, with examples of the medium/media including magnetic storage media (e.g., floppy disks, hard disks, magnetic tapes, etc.), optical media (e.g., CD-ROMs, DVDs, etc.), magneto-optical media (e.g., floptical disks), and hardware storage devices (e.g., read only memory media, random access memory media, flash memories, etc.), which may include computer readable code/instructions, data files, data structures, etc. The medium/media may also be a distributed network, so that the computer readable code/instructions are stored and executed in a distributed fashion. The computer readable code/instructions may be executed by one or more processors. The computer readable code/instructions may also be executed and/or embodied in at least one application specific integrated circuit (ASIC) or Field Programmable Gate Array (FPGA).

In addition, one or more software modules or one or more hardware modules may be configured in order to perform the operations of the above-described exemplary embodiments.

The term "module", as used herein, denotes, but is not limited to, a software component, a hardware component, a plurality of software components, a plurality of hardware components, a combination of a software component and a hardware component, a combination of a plurality of software components and a hardware component, a combination of a software component and a plurality of hardware components, or a combination of a plurality of software components and a plurality of hardware components, which performs certain tasks. A module may advantageously be configured to reside on the addressable storage medium/media and configured to execute on one or more processors. Thus, a module may include, by way of example, components, such as software components, application specific software component, object-oriented software components, class components and task components, processes, functions, operations, execution threads, attributes, procedures, subroutines, segments of program code, drivers, firmware, microcode, circuitry, data, databases, data structures, tables, arrays, and variables. The functionality provided for in the components or modules may be combined into fewer components or modules or may be further separated into additional components or modules. Further, the components or modules can operate at least one processor (e.g. central processing unit (CPU)) provided in a device. In addition, examples of a hardware components include an application specific integrated circuit (ASIC) and Field Programmable Gate Array (FPGA). As indicated above, a module can also denote a combination of a software component(s) and a hardware component(s). These hardware components may also be one or more processors.

The computer readable code/instructions and computer readable medium/media may be those specially designed and constructed for the purposes of the present invention, or they may be of the kind well-known and available to those skilled in the art of computer hardware and/or computer software.

According to an exemplary embodiment of the invention, at least one of the following advantages can be obtained.

A change of movement of multi-touch points based on multiple fingers can be sensed and analyzed using information on the magnitude of capacitance of electrode channels forming a two-dimensional capacitive sensor and information on a change in the magnitude of the capacitance.

Further, since a sensing operation based multiple fingers is possible even using the existing sensor for locating one touch point, exemplary embodiments can be applied to a mobile apparatus in which an extended user interface is implemented.

Advantages of the invention are not limited to those mentioned above, and other advantages of the invention will be apparently understood by those skilled in the art.

Although a few exemplary embodiments of the present invention have been shown and described, it would be appreciated by those skilled in the art that changes may be made in these exemplary embodiments without departing from the principles and spirit of the invention, the scope of which is defined in the claims and their equivalents.

What is claimed is:

1. An apparatus for sensing movement of multi-touch points using a two-dimensional capacitive sensor, the apparatus comprising:
a capacitance sensing unit to sense two or more touch points, and to sense capacitance and a change in capacitance on the basis of the sensed touch points,
wherein the two-dimensional capacitive sensor further comprises two or more parallel electrode channels among "M" number of X axis sensing electrode channels or two or more parallel electrode channels among "N" number of Y axis sensing electrode channels;
a movement analyzing unit to sense and analyze a change of movement of the two or more touch points using information on the sensed capacitance and change in capacitance; and
a command processing unit to process a command corresponding to the change in movement,
wherein the movement analyzing unit comprises:
a capacitance magnitude detecting unit to sense the magnitude of the sensed capacitance in each of the two or more X axis sensing electrode channels or in each of the two or more Y axis sensing electrode channels;
a capacitance magnitude change detecting unit to detect a change of the detected magnitude of the capacitance over time in each of the two or more X axis sensing electrode channels or in each of the two or more Y axis sensing electrode channels;
a capacitance magnitude change speed detecting unit to detect a second-order differential value of the capacitance magnitude in each of the two or more X axis sensing electrode channels or in each of the two or more Y axis sensing electrode channels; and a movement pattern determining unit to determine a movement pattern of the two or more touch points using information on the magnitude of the capacitance, the change of the magnitude of the capacitance over time, and the detected second-order differential value of the capacitance magnitude,
wherein the movement pattern determining unit determines a multi-touch point moving mode, in which all of the two or more touch points move, when the change of the capacitance magnitude over time is larger than a predetermined threshold value,
wherein the movement pattern determining unit determines a multi-touch point moving mode, in which all of the two or more touch points move, when the change of the capacitance magnitude over time is less than a negative predetermined threshold value,
wherein, when two touch points at the left and right move in a horizontal direction, the multi-touch point moving mode comprises:
a mode that all of the two touch points move outward;
a mode that all of the two touch points move inward;
a mode that the left touch point moves inward and the right touch point moves outward; and
a mode that the left touch point moves outward and the right touch point moves inward.

2. The apparatus of claim 1, wherein the capacitance sensing unit senses the capacitance and the change in capacitance using electrical signals that are generated through the 'M' number of sensing electrode channels arranged in a vertical direction at predetermined intervals and the 'N' number of sensing electrode channels arranged in a horizontal direction at predetermined intervals.

3. The apparatus of claim 2, wherein the movement analyzing unit calculates position information on the two or more touch points using the information on the sensed capacitance from Equations, $$P_x = \frac{\sum_{i=1}^{M} x_i p_x^i}{\sum_{i=1}^{M} x_i} \text{ and } P_y = \frac{\sum_{j=1}^{N} y_j p_y^j}{\sum_{j=1}^{N} y_j}$$

where the $P_x$ and $P_y$ are an x-axis position value and a y-axis position value, respectively, which are calculated according to the weighted average method, the $p_x^i$ is a position value that is arbitrarily defined in an i-th electrode channel along the X axis, the $p_y^j$ is a position value that is arbitrarily defined in a j-th electrode channel along the Y axis, the $x_i$ is the magnitude of capacitance generated in the $p_x^i$, and the $y_j$ is the magnitude of capacitance generated in the $p_y^j$.

4. The apparatus of claim 1, wherein the movement pattern determining unit determines a non-moving mode, in which all of the two or more touch points do not move, when the change of the capacitance magnitude over time is smaller than the predetermined threshold value and greater than the negative predetermined threshold value.

5. The apparatus of claim 1, wherein the movement pattern determining unit determines a one point-fixed one point-moving mode, in which the first touch point is fixed and the second touch point moves, when the two or more touch points are generated within a predetermined time, if the magnitude of the capacitance at the first touch point in contact with a first electrode channel keeps constant, and the change of the capacitance magnitude over time at the second touch point in contact with a second electrode channel in parallel with the first electrode channel is larger than a predetermined threshold value.

6. The apparatus of claim 5, wherein the movement pattern determining unit calculates position information on the first touch point and the second touch point, when the second touch point moves while the magnitude of the capacitance at the first touch point is stored, by calculating the magnitude of capacitance of the moved second touch point by subtracting the stored capacitance magnitude at the first touch point from the capacitance magnitude after the movement.

7. The apparatus of claim 1, wherein when two touch points move in a vertical direction, the multi-touch point moving mode comprises:
a mode that the two touch points move upward;
a mode that the two touch points move downward;
a mode that one of the two touch points moves upward and the other touch point moves downward.

8. A method of sensing movement of multi-touch points using a two-dimensional capacitive sensor, the method comprising:
sensing two or more touch points, and sensing capacitance and a change in capacitance on the basis of the sensed touch points,
wherein the two-dimensional capacitive sensor further comprises two or more parallel electrode channels among "M" number of X axis sensing electrode channels or two or more parallel electrode channels among "N" number of Y axis sensing electrode channels;
sensing and analyzing a change of movement of the two or more touch points using information on the sensed capacitance and change in capacitance; and
processing a command corresponding to the change of movement,
wherein the sensing and analyzing of the change of movement of the two or more touch points using the information on the sensed capacitance and change in capacitance further comprises:
sensing the magnitude of the sensed capacitance in each of the two or more X axis sensing electrode channels or in each of the two or more Y axis sensing electrode channels;
detecting a change of the detected magnitude of the capacitance over time in each of the two or more X axis sensing electrode channels or in each of the two or more Y axis sensing electrode channels;
detecting a second-order differential value of the capacitance magnitude in each of the two or more X axis sensing electrode channels or in each of the two or more Y axis sensing electrode channels; and
determining a movement pattern of the two or more touch points using the information on the magnitude of the capacitance, the change of the magnitude of the capacitance over time, and the detected second-order differential value of the capacitance magnitude,
wherein the determining of the movement pattern of the two or more touch points comprises determining a multi-touch point moving mode, in which all of the two or more touch points move simultaneously, when the change of the capacitance magnitude over time is larger than a predetermined threshold value,
wherein the determining of the movement pattern of the two or more touch points comprises determining a multi-touch point moving mode, in which all of the two or more touch points move simultaneously, when the change of the capacitance magnitude over time is less than a negative predetermined threshold value,
wherein when two touch points at the left and right move in a horizontal direction, the multi-touch point moving mode comprises:
a mode that all of the two touch points move outward;
a mode that all of the two touch points move inward;
a mode that the left touch point moves inward and the right touch point moves outward; and
a mode that the left touch point moves outward and the right touch point moves inward.

9. The method of claim 8, wherein the sensing of two or more touch points and sensing capacitance and the change in capacitance on the basis of the sensed touch points comprises sensing the capacitance and the change in capacitance using electrical signals that are generated through the 'M' number of sensing electrode channels arranged in a vertical direction at predetermined intervals and the 'N' number of sensing electrode channels arranged in a horizontal direction at predetermined intervals.

10. The method of claim 9, wherein in the sensing and analyzing of the change of movement of the two or more touch points using the information on the sensed capacitance and change in capacitance, position information on the two or more touch points is calculated using the information on the sensed capacitance from Equations, $$P_x = \frac{\sum_{i=1}^{M} x_i p_x^i}{\sum_{i=1}^{M} x_i} \text{ and } P_y = \frac{\sum_{j=1}^{N} y_j p_y^j}{\sum_{j=1}^{N} y_j}$$

where the $P_x$ and $P_y$ are an x-axis position value and a y-axis position value, respectively, which are calculated according to the weighted average method, the $p_x^i$ is a position value that is arbitrarily defined in an i-th electrode channel along the X axis, $p_y^j$ is a position value that is arbitrarily defined in a j-th electrode channel along the Y axis, the $x_i$ is the magnitude of capacitance generated in the $p_x^i$, and the $y_j$ is the magnitude of capacitance generated in the $p_y^j$.

11. The method of claim 8, wherein the determining of the movement pattern of the two or more touch points comprises determining a non-moving mode, in which all of the two or more touch points do not move, when the change of the capacitance magnitude over time is smaller than the predetermined threshold value and greater than the negative predetermined threshold value.

12. The method of claim 8, wherein the determining of the movement pattern of the two or more touch points comprises determining a one point-fixed one point-moving mode, in which the first touch point is fixed and the second touch point moves, when the two or more touch points are generated within a predetermined time, if the magnitude of the capacitance at the first touch point in contact with a first electrode channel keeps constant, and the change of the capacitance magnitude over time at the second touch point in contact with a second electrode channel in parallel with the first electrode channel is larger than a predetermined threshold value.

13. The method of claim 12, wherein the determining of the movement pattern of the two or more touch points comprises:
storing the magnitude of the capacitance at the first touch point;
moving the second touch point;

subtracting the stored capacitance magnitude at the first touch point from the capacitance magnitude after the movement so as to calculate the magnitude of capacitance at the moved second touch point; and calculating position information on the first touch point and the second touch point on the basis of the calculated capacitance magnitude at the first touch point and capacitance magnitude at the second touch point.

14. The method of claim 8, wherein when two touch points move in a vertical direction, the multi-touch point moving mode comprises:

a mode that the two touch points move upward;
a mode that the two touch points move downward;
a mode that one of the two touch points moves upward and the other touch point moves downward.

15. A mobile apparatus that has a touch screen and senses movement of multi-touch points, the apparatus comprising:

a capacitive sensor to sense two or more touch points, and to sense capacitance and a change in capacitance on the basis of the sensed touch points, wherein the two-dimensional capacitive sensor further comprises two or more parallel electrode channels among "M" number of X axis sensing electrode channels or two or more parallel electrode channels among "N" number of Y axis sensing electrode channels;

a movement analyzing unit to sense and analyzing a change of movement of the two or more touch points using information on the sensed capacitance and change in capacitance;

an output unit to output a command corresponding to the change of movement; and a command processing control unit to perform control to process the output command, wherein the movement analyzing unit comprises:

a capacitance magnitude detecting unit to sense the magnitude of the sensed capacitance in each of the two or more X axis sensing electrode channels or in each of the two or more Y axis sensing electrode channels;

a capacitance magnitude change detecting unit to detect a change of the detected magnitude of the capacitance over time in each of the two or more X axis sensing electrode channels or in each of the two or more Y axis sensing electrode channels;

a capacitance magnitude change speed detecting unit to detect a second-order differential value of the capacitance magnitude in each of the two or more X axis sensing electrode channels or in each of the two or more Y axis sensing electrode channels; and a movement pattern determining unit to determine a movement pattern of the two or more touch points using information on the magnitude of the capacitance, the change of the magnitude of the capacitance over time, and the detected second-order differential value of the capacitance magnitude, wherein the movement pattern determining unit determines a multi-touch point moving mode, in which all of the two or more touch points move simultaneously, when the change of the capacitance magnitude over time is larger than a predetermined threshold value, wherein the movement pattern determining unit determines a multi-touch point moving mode, in which all of the two or more touch points move simultaneously, when the change of the capacitance magnitude over time is less than a negative predetermined threshold value, wherein when two touch points at the left and right move in a horizontal direction, the multi-touch point moving mode comprises:

a mode that all of the two touch points move outward;
a mode that all of the two touch points move inward;
a mode that the left touch point moves inward and the right touch point moves outward; and
a mode that the left touch point moves outward and the right touch point moves inward.

16. The apparatus of claim 15, wherein the capacitive sensor senses the capacitance and the change in capacitance using electrical signals that are generated through the 'M' number of sensing electrode channels arranged in a vertical direction at predetermined intervals and the 'N' number of sensing electrode channels arranged in a horizontal direction at predetermined intervals.

17. The apparatus of claim 16, wherein the movement analyzing unit calculates position information on the two or more touch points using the information on the sensed capacitance from Equations, $$P_x = \frac{\sum_{i=1}^{M} x_i p_x^i}{\sum_{i=1}^{M} x_i} \text{ and } P_y = \frac{\sum_{j=1}^{N} y_j p_y^j}{\sum_{j=1}^{N} y_j}$$

where the $P_x$ and $P_y$ are an x-axis position value and a y-axis position value, respectively, which are calculated according to the weighted average method, the $p_x^i$ is a position value that is arbitrarily defined in an i-th electrode channel along the X axis, $p_y^j$ is a position value that is arbitrarily defined in a j-th electrode channel along the Y axis, the $x_i$ is the magnitude of capacitance generated in the $p_x^i$ and the $y_j$ is the magnitude of capacitance generated in the $p_y^j$.

18. The apparatus of claim 15, wherein the movement pattern determining unit determines a non-moving mode, in which all of the two or more touch points do not move, when the change of the capacitance magnitude over time is smaller than the predetermined threshold value and greater than the negative predetermined threshold value.

19. The apparatus of claim 15, wherein the movement pattern determining unit determines a one point-fixed one point-moving mode, in which the first touch point is fixed and the second touch point moves, when the two or more touch points are generated within a predetermined time, if the magnitude of the capacitance at the first touch point in contact with a first electrode channel keeps constant, and the change of the capacitance magnitude over time at the second touch point in contact with a second electrode channel in parallel with the first electrode channel is larger than a predetermined threshold value.

20. The apparatus of claim 19, wherein the movement pattern determining unit calculates position information on the first touch point and the second touch point, when the second touch point moves while the magnitude of the capacitance at the first touch point is stored, by calculating the magnitude of capacitance of the moved second touch point by subtracting the stored capacitance magnitude at the first touch point from the capacitance magnitude after the movement.

21. At least one non-transitory computer readable medium storing computer readable instructions that control at least one processor to implement the method of claim 8.

22. The mobile apparatus of claim 15, wherein when two touch points move in a vertical direction, the multi-touch point moving mode comprises:

a mode that the two touch points move upward;
a mode that the two touch points move downward;
a mode that one of the two touch points moves upward and the other touch point moves downward.

23. An apparatus for sensing movement of multi-touch points using a two-dimensional capacitive sensor, the apparatus comprising:
- a capacitance sensor to sense two or more touch points, and to sense capacitance and a change in capacitance on the basis of the sensed touch points,
- wherein the two-dimensional capacitive sensor further comprises two or more parallel electrode channels among "M" number of X axis sensing electrode channels or two or more parallel electrode channels among "N" number of Y axis sensing electrode channels; and
- a movement analyzer to sense and analyze a change of movement of the two or more touch points using information on the sensed capacitance and change in capacitance to determine a movement pattern,
- wherein the movement analyzing unit comprises:
- a capacitance magnitude detecting unit to sense the magnitude of the sensed capacitance in each of the two or more X axis sensing electrode channels or in each of the two or more Y axis sensing electrode channels;
- a capacitance magnitude change detecting unit to detect a change of the detected magnitude of the capacitance over time in each of the two or more X axis sensing electrode channels or in each of the two or more Y axis sensing electrode channels;
- a capacitance magnitude change speed detecting unit to detect a second-order differential value of the capacitance magnitude in each of the two or more X axis sensing electrode channels or in each of the two or more Y axis sensing electrode channels; and
- a movement pattern determining unit to determine a movement pattern of the two or more touch points using information on the magnitude of the capacitance, the change of the magnitude of the capacitance over time, and the detected second-order differential value of the capacitance magnitude,
- wherein the movement pattern determining unit determines a multi-touch point moving mode, in which all of the two or more touch points move simultaneously, when the change of the capacitance magnitude over time is larger than a predetermined threshold value,
- wherein the movement pattern determining unit determines a multi-touch point moving mode, in which all of the two or more touch points move simultaneously, when the change of the capacitance magnitude over time is less than a negative predetermined threshold value,
- wherein when two touch points at the left and right move in a horizontal direction, the multi-touch point moving mode comprises:
- a mode that all of the two touch points move outward;
- a mode that all of the two touch points move inward;
- a mode that the left touch point moves inward and the right touch point moves outward; and
- a mode that the left touch point moves outward and the right touch point moves inward.

24. The apparatus of claim 23, wherein when two touch points move in a vertical direction, the multi-touch point moving mode comprises:
- a mode that the two touch points move upward;
- a mode that the two touch points move downward;
- a mode that one of the two touch points moves upward and the other touch point moves downward.

25. A method of sensing movement of multi-touch points using a two-dimensional capacitive sensor, the method comprising:
- sensing capacitance and a change in capacitance based on two or more sensed touch points,
- wherein the two-dimensional capacitive sensor further comprises two or more parallel electrode channels among "M" number of X axis sensing electrode channels or two or more parallel electrode channels among "N" number of Y axis sensing electrode channels; and
- sensing and analyzing a change of movement of the two or more touch points using information on the sensed capacitance and change in capacitance to determine a movement pattern,
- wherein the sensing and analyzing of the change of movement of the two or more touch points using the information on the sensed capacitance and change in capacitance further comprises:
- sensing the magnitude of the sensed capacitance in each of the two or more X axis sensing electrode channels or in each of the two or more Y axis sensing electrode channels;
- detecting a change of the detected magnitude of the capacitance over time in each of the two or more X axis sensing electrode channels or in each of the two or more Y axis sensing electrode channels;
- detecting a second-order differential value of the capacitance magnitude in each of the two or more X axis sensing electrode channels or in each of the two or more Y axis sensing electrode channels; and
- determining a movement pattern of the two or more touch points using the information on the magnitude of the capacitance, the change of the magnitude of the capacitance over time, and the detected second-order differential value of the capacitance magnitude,
- wherein the determining of the movement pattern of the two or more touch points comprises determining a multi-touch point moving mode, in which all of the two or more touch points move simultaneously, when the change of the capacitance magnitude over time is larger than a predetermined threshold value,
- wherein the determining of the movement pattern of the two or more touch points comprises determining a multi-touch point moving mode, in which all of the two or more touch points move simultaneously, when the change of the capacitance magnitude over time is less than a negative predetermined threshold value,
- wherein when two touch points at the left and right move in a horizontal direction, the multi-touch point moving mode comprises:
- a mode that all of the two touch points move outward;
- a mode that all of the two touch points move inward;
- a mode that the left touch point moves inward and the right touch point moves outward; and
- a mode that the left touch point moves outward and the right touch point moves inward.

26. The method of claim 25, wherein when two touch points move in a vertical direction, the multi-touch point moving mode comprises:
- a mode that the two touch points move upward;
- a mode that the two touch points move downward;
- a mode that one of the two touch points moves upward and the other touch point moves downward.

27. A mobile apparatus that has a touch screen and senses movement of multi-touch points, the apparatus comprising:

a capacitive sensor to sense two or more touch points, and to sense capacitance and a change in capacitance on the basis of the sensed touch points, wherein the two-dimensional capacitive sensor further comprises two or more parallel electrode channels among "M" number of X axis sensing electrode channels or two or more parallel electrode channels among "N" number of Y axis sensing electrode channels; and a movement analyzer to sense and analyze a change of movement of the two or more touch points using information on the sensed capacitance and change in capacitance to determine a movement pattern, wherein the movement analyzing unit comprises:

a capacitance magnitude detecting unit to sense the magnitude of the sensed capacitance in each of the two or more X axis sensing electrode channels or in each of the two or more Y axis sensing electrode channels;

a capacitance magnitude change detecting unit to detect a change of the detected magnitude of the capacitance over time in each of the two or more X axis sensing electrode channels or in each of the two or more Y axis sensing electrode channels;

a capacitance magnitude change speed detecting unit to detect a second-order differential value of the capacitance magnitude in each of the two or more X axis sensing electrode channels or in each of the two or more Y axis sensing electrode channels; and a movement pattern determining unit to determine a movement pattern of the two or more touch points using information on the magnitude of the capacitance, the change of the magnitude of the capacitance over time, and the detected second-order differential value of the capacitance magnitude, wherein the movement pattern determining unit determines a multi-touch point moving mode, in which all of the two or more touch points move simultaneously, when the change of the capacitance magnitude over time is larger than a predetermined threshold value, wherein the movement pattern determining unit determines a multi-touch point moving mode, in which all of the two or more touch points move simultaneously, when the change of the capacitance magnitude over time is less than a negative predetermined threshold value, wherein when two touch points at the left and right move in a horizontal direction, the multi-touch point moving mode comprises:

a mode that all of the two touch points move outward;

a mode that all of the two touch points move inward;

a mode that the left touch point moves inward and the right touch point moves outward; and a mode that the left touch point moves outward and the right touch point moves inward.

28. The mobile apparatus of claim 27, wherein when two touch points move in a vertical direction, the multi-touch point moving mode comprises:

a mode that the two touch points move upward;

a mode that the two touch points move downward;

a mode that one of the two touch points moves upward and the other touch point moves downward.

* * * * *

UNITED STATES PATENT AND TRADEMARK OFFICE
CERTIFICATE OF CORRECTION

PATENT NO. : 8,212,782 B2
APPLICATION NO. : 11/802906
DATED : July 3, 2012
INVENTOR(S) : Seong-il Cho et al.

Page 1 of 1

It is certified that error appears in the above-identified patent and that said Letters Patent is hereby corrected as shown below:

Column 12, Line 46, In Claim 3, delete "$P_X$" and insert -- $P_x$ --, therefor.

Column 16, Line 35 (Approx.), In Claim 17, delete " $p_x^i$ " and insert -- $p_x^i,$ --, therefor.

Signed and Sealed this
Twentieth Day of November, 2012

David J. Kappos
*Director of the United States Patent and Trademark Office*